United States Patent Office 3,257,152
Patented June 21, 1966

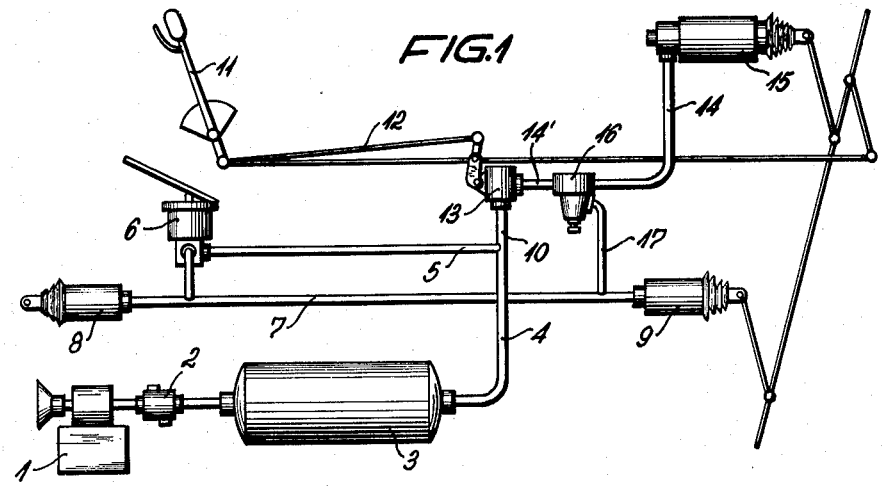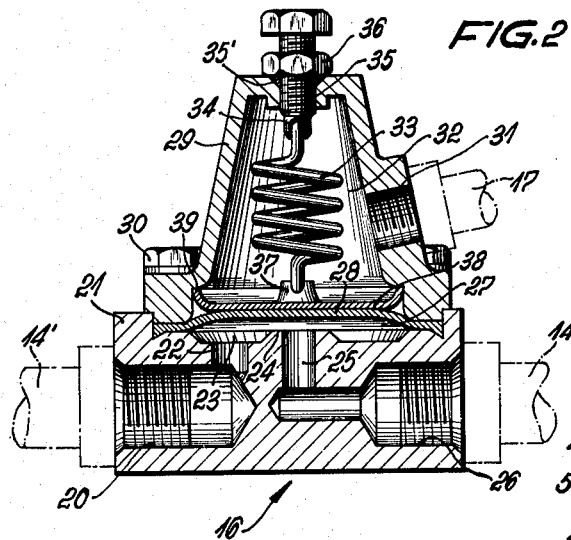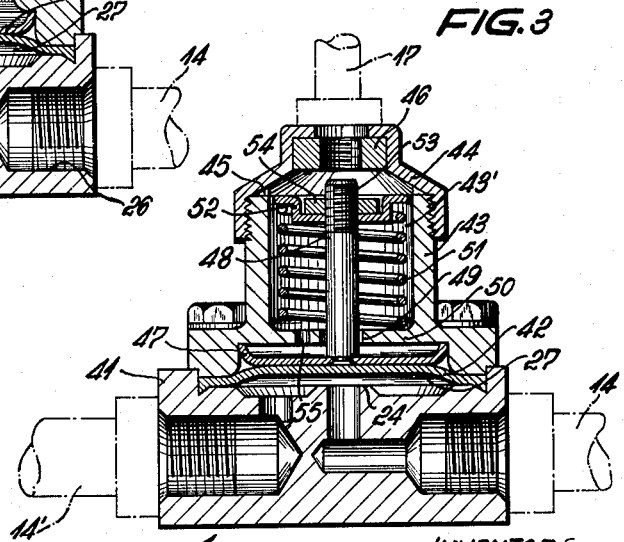

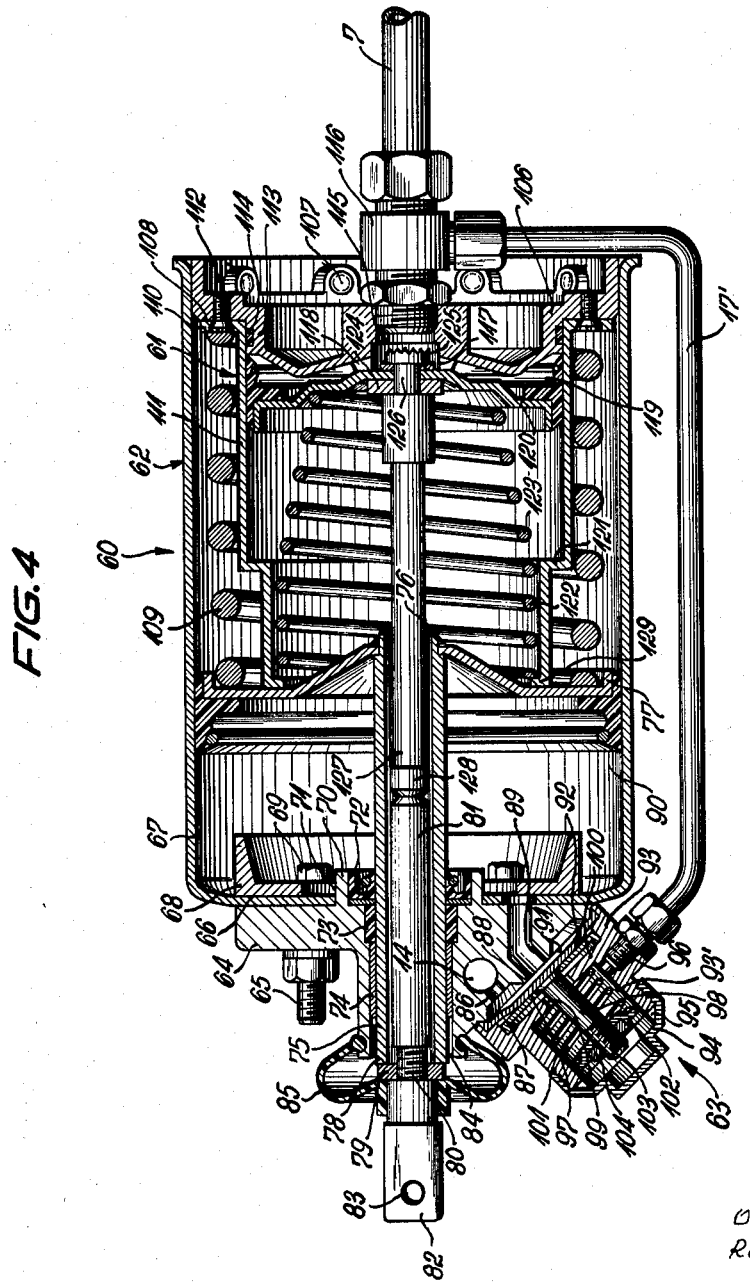

3,257,152
MAIN AND AUXILIARY BRAKE CONTROLS WITH INNER SUPPRESSION OF THE AUXILIARY CONTROL
Oskar Vielmo, Stuttgart-Sonnenberg, and Reinhold Schöll, Ditzingen, Germany, assignors to Robert Bosch G.m.b.H., Stuttgart, Germany
Filed Sept. 25, 1963, Ser. No. 311,450
Claims priority, application Germany, Sept. 26, 1962, B 68,979
10 Claims. (Cl. 303—13)

The present invention relates to braking systems for vehicles, particularly vehicles such as automobiles, trucks, and the like.

Known brake systems of this type are fluid operated, the fluid being, for example, compressed air, and such brake systems conventionally include a main brake system which is used during normal operation of the vehicle and an auxiliary brake system which is used at times other than normal operation, such as when the vehicle is stationary, for example. The main brake system is conventionally actuated by a foot pedal while the auxiliary brake system is conventionally actuated by a hand lever. The two systems may actuate the same braking elements at the wheels of the vehicle, and the auxiliary system generally includes a spring-urged linkage which urges the brakes at the wheels into their braking positions while a fluid such as compressed air is available for opposing the spring-urged linkage or the like of the auxiliary system.

Generally the main brake system will actuate brakes at all of the vehicle wheels while the auxiliary system will operate only the brakes at the rear wheels of the vehicle. A spring-urged structure is used for the auxiliary system for safety purposes since if there is an unexpected drop in pressure of the pressure fluid the spring-urged structure will automatically cause the auxiliary system to apply the brakes to the rear wheels, for example, and thus accidents will be avoided in the event of a failure in the fluid system.

Generally brake systems of the above type are constructed in such a way that the main braking system is capable of applying to the brakes a force almost as great as the limiting braking force at which the wheels will lock. In other words, if it is possible for operator of a vehicle to apply to the brakes a force which is too great, then the wheels will simply lock and skidding and loss of control of the vehicle may result. It is thus conventional to design the braking systems in such a way that the braking force which can be applied will be almost as great as the limiting braking force beyond which locking of the wheels will occur, and this force is conventionally provided by the main braking system itself. Of course any additional braking force would result in locking of the wheels.

Assuming now that a vehicle of the above type is operated in such a way that when the operator applies the main braking system to slow the vehicle down the operator also applies the auxiliary braking system, then the braking force of the auxiliary system will add to the braking force of the main system providing a braking force far greater than the limit at which the wheels will lock, and this under these conditions with a conventional braking assembly as described above it is very easily possible for skids and loss of control to occur if the operator should apply the auxiliary system simultaneously with the main braking system while slowing the vehicle down.

It is, therefore, a primary object of the present invention to provide for a brake installation of the above type a construction which will reliably avoid the adding of the braking force of the auxiliary system to the braking force of the main system to such an extent that the total braking force will exceed the limit beyond which wheel lock will occur while bringing the vehicle to a halt or slowing it down.

A further object of the present invention is to provide a structure of the above type in which it is indeed possible to simultaneously actuate both the main and the auxiliary brake systems without however providing a total braking force exceeding the limit beyond which wheel lock occurs.

Yet another object of the present invention is to provide a structure of the above type which is fully automatic in its operation.

An additional object of the present invention is to provide a structure of the above type which is capable of being adjusted so as to operate very effectively according to the characteristics of the particular braking installation, and in particular according to the characteristics of the auxiliary brake means.

Still another object of the present invention is to provide a structure of the above type which is exceedingly simple and compact and which can be incorporated without difficulty into existing vehicles as well as of course into newly manufactured vehicles.

Also, the objects of the present invention include the provision of a structure where components of the main and auxiliary systems and the controls associated therewith are all combined into a single compact unitary assembly capable of being supplied with a fluid such as compressed air from a single source and capable of operating on the same braking structure.

With the above objects in view the invention includes, in a vehicle, a main fluid-operated braking means which is used during normal operation of the vehicle and an auxiliary fluid-operated braking means which is used at times other than during normal operation, as when the vehicle is stationary, for example. In accordance with the present invention a control means is operatively connected to both of the braking means for automatically preventing the auxiliary braking means from providing a braking force, during slowing down of the vehicle, which is greater than the difference between the limiting braking force beyond which wheel lock will occur and the braking force which is already provided by the main braking means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic illustration of a pneumatic braking installation according to the present invention;

FIG. 2 is a sectional elevation of one embodiment of the control means of the present invention;

FIG. 3 is a sectional elevation of another embodiment of the control means of the present invention; and FIG. 4 is a longitudinal sectional view of a unitary assembly which includes components of the main and auxiliary braking means and the control means connected thereto.

Referring to FIG. 1, a compressor 1 maintains in a tank 3 a supply of compressed air at a pressure determined by the pressure regulator 2. Through the conduits 4 and 5 the air under pressure from the tank 3 reaches a foot-operated valve 6. When the valve 6 is opened, by actuation of the foot of the operator, the compressed air will flow from the conduit 5 to the conduit 7 and from the latter to the front wheel brake cylinders 8 and the rear wheel brake cylinders 9, only one of each of these cylinders being shown in the schematic illustration of FIG. 1. When the operator releases the foot pedal the valve 6 automatically closes and the conduit 7 is at atmospheric pressure so that the brakes are released. The valve 6 together with the conduit 7 and the brake cylinders 8 and 9 form the main brake means which is used during normal operation of the vehicle.

An auxiliary brake means is connected to the source of compressed air 3 through the conduit 10 which forms an extension of the conduit 4 in the illustration of FIG. 1. This auxiliary brake means includes the hand-operated brake lever 11 which through a linkage 12, which is conventional, actuates an auxiliary valve 13 which communicates with and is connected to the conduit 10. The conduit 14' is also connected to and communicates with the valve 13, and this conduit 14' is also connected to the control means 16 of the present invention, the details of which are described below. A conduit 14 leads from the control means 16 to the brake cylinders 15 which are connected to the brake shoes of the rear wheel brake assemblies, only one cylinder 15 being shown in the schematic illustration of FIG. 1. The cylinders 15 and the cylinders 9 are operatively connected to the same brake shoe elements through suitable linkages for moving these elements toward and away from the brake drums as is well known in the art. The brake cylinders 15 are urged toward their operating positions applying the brake shoes against the brake drums by springs, and when fluid under pressure is delivered to the cylinders 15 through the valve 13 the fluid under pressure opposes the force of the springs and maintains the cylinders 15 in their inoperative positions where they do not apply the brake shoes against the brake drums. The control means 16 is in communication with a conduit 17 which also communicates with the conduit 7 so that when the operator opens the valve 6 the fluid under pressure will not only flow to the brake cylinders 8 and 9 but also to the control means 16.

Referring now to FIG. 2, one possible embodiment of the control means 16 is illustrated therein. This control means 16 includes a housing made up of a lower member 21 and a hollow member 29 which is connected at its bottom end to the member 21. The member 21 of the housing is formed with a passage 20 connected fluid-tightly with the conduit 14' and communicating with a bore 22 leading to the annular chamber 23 formed in the interior of the member 21 and surrounding a raised portion the top surface of which forms a valve seat 24, as viewed in FIG. 2. The member 21 includes a bore 25 concentrically surrounded at its top end by the valve seat 24 and communicating with a further passage 26 which communicates with the conduit 14 in a fluid-tight manner.

The annular chamber 23 of the housing 21, 29 forms part of a lower chamber 27, as viewed in FIG. 2, which is separated from an upper chamber 32 of the housing in a fluid-tight manner by a movable wall formed by the flexible resilient diaphragm or membrane 28 the periphery of which is clamped between the members 21 and 29 in the manner indicated in FIG. 2. Thus, whenever the movable wall or membrane 28 is raised from the valve seat 24 fluid under pressure can flow to and from the cylinder 15 through the control means 16 in response to actuation of the valve 13, while when the wall 28 engages the valve seat 24 the path of fluid flow to and from the cylinder 15 is closed, so that in this way the control means 16 forms a valve structure for controlling the flow of the pressure fluid which operates the auxiliary brake means 13–15. The screws 30 may be passed through bores in a flange at the bottom of the hollow member 29 and threaded into bores of the member 21 for fixing the members 21 and 29 to each other so as to form the control housing. A side wall portion of the member 29 is formed with a threaded opening 31 connected fluid-tightly to the conduit 17. A spring 33 is located in the chamber 32 and is hooked at its top end through an opening 34 formed at the bottom of a screw 35 threaded through a threaded opening in the top wall of the member 29, and thus it is possible by turning the screw 35 to adjust the tension of the spring 33 whose bottom end is attached to a projection 37 of a plate 38 which is fixed to the membrane or diaphragm 28 as by being vulcanized thereto, for example, so that the wall or plate 38 forms part of the movable wall means which of course responds automatically to the pressure differential between the chambers 27 and 32. A sealing ring 35' guarantees a fluid-tight connection of the adjustable screw 35 to the top wall of the member 29 and a lock nut 36 maintains the screw 35 in its adjusted position. The member 29 is provided in its interior with a downwardly directed shoulder 39 adapted to be engaged by the upwardly directed outer periphery of the plate 38 so as to limit the extend of movement of the movable wall means 28, 38 away from the valve seat 24.

When the auxiliary brake means is released the valve 13 thereof is open so that the fluid under pressure flows from the tank 3 through the conduits 4 and 10 and the valve 13 into the conduit 14' and through the control means 16 and conduit 14 into the brake cylinder 15 for acting therein against the spring thereof to oppose this spring and maintain the brake cylinder 15 in its inoperative position where the brake structure is released. Assuming that the vehicle is moving at this time without actuation of the main brake means, then the valve 6 is closed and the conduit 7 is at atmospheric pressure, so that the conduit 17 is also at atmospheric pressure and thus the pressure of the fluid in the auxiliary brake means and therefore in the chamber 27 is greater than the pressure of the fluid in the chamber 32 so that this fluid pressure of the auxiliary brake means together with the force of the spring 33 maintain the membrane 28 away from the valve seat 24. Should the operator of the vehicle apply the main brake means, then the actuation of the foot pedal will open the valve 6 so that fluid under pressure will flow into the conduit 7 to apply the brakes through the cylinders 8 and 9. After the vehicle has come to a stop the operator will remove his foot from the brake pedal so that the valve 6 will close and will automatically release the air from the conduit 7 to the outer atmosphere as is well known in the art, and thus the brakes are released by the main brake means. If the operator should pull on the hand lever 11 to apply the auxiliary brake means then the valve 13 will in a well known manner release the compressed air from the cylinder 15 and the conduits 14 and 14' to the outer atmosphere so that the springs in the brake cylinders 15 will be released to apply the brakes. Thus, by applying the hand brake lever the vehicle is secured against rolling. The advantage of this type of system is that if there should be a failure in the compressed air system providing an unexpected drop in pressure the springs of the auxiliary brake system will automatically apply the brakes so that accidents resulting from too little fluid pressure are avoided.

The control means 16 is situated between the conduits 14 and 14' in order to prevent the force of the auxiliary brake means from being added undesirably to the force of the main brake means if the auxiliary brake means is applied simultaneously with the main brake means while bringing the vehicle to a stop or slowing it down. Thus, it will be seen that when the valve 6 is opened when the operator actuates the main brake means the fluid under pressure will flow from the conduit 7 through the conduit 17 into the chamber 32 to act on the movable wall means 28, 38 moving the latter into engagement with the valve seat 24 so as to close the passage 25 in a fluid-tight manner. Therefore, if at this time the operator should actuate the lever 11 to apply the auxiliary brake means it will not be possible for air to flow out of the cylinders 15 through the conduit 14 and passages 26 and 25 because the membrane 28 engages the valve seat 24. Thus, it is not possible for the fluid pressure of the auxiliary brake means to drop while the main brake means is applied and thus the springs of the brake cylinders 15 cannot be released to apply the auxiliary braking force. Only when the operator releases the foot pedal so as to open the valve 6 will the pressure in the chamber 32 be reduced simultaneously with the drop in the pressure applied to the cylinders 8 and 9, so that the air under pressure in the cylinders 15 can then move the wall means 28, 38 away from the valve seat and escape to the outer atmosphere through the valve 13 which is opened when the operator actuates the lever 11 so that the springs can actuate the auxiliary brake means.

If upon release of the air under pressure from the auxiliary brake means the springs thereof provided precisely the same braking force as the brake cylinders of the main brake means when air under pressure is supplied thereto, then the spring 33 of the control means 16 would be unnecessary. However, this is not the case. In order to guarantee that the springs of the auxiliary brake means do not apply the brakes thereof during normal operation when the vehicle is moving and in order to take care of unavoidable variations in the pressure of the fluid which might also result in undesired application of the brakes of the auxiliary system due to a drop in air pressure, the pressure at which the springs of the auxiliary brake means are maintained reliably in their inoperative positions preventing release of the auxiliary brake system is approximately one atmosphere less than the pressure of the fluid delivered to the cylinders of the main brake means, this latter pressure being conventionally on the order of five atmospheres. Thus, it is necessary to provide in the chamber 32 the spring 33 acting on the movable wall means 28, 38 in the same direction as the pressure of the fluid of the auxiliary brake means so as to compensate for this difference of one atmosphere between the pressures of the two systems. The spring 33 is adjusted by the screw 35 in such a way that the pressure in the auxiliary brake system must drop by one atmosphere in order for the membrane 28 to reach the valve seat 24, or in other words there must be a pressure differential of one atmosphere between the chambers 32 and 27 in order to provide in the chamber 32 a force sufficiently greater than the force in the chamber 27 to overcome the force of the spring 33. If, for example, the main brake means is operated in such a way that the pressure applied to the brakes through the cylinders 8 and 9 by partial opening of the valves 6 is on the order of three atmospheres, so that the brakes are only partially applied, then of course this same pressure of three atmospheres will be present in the chamber 32 of the control means 16, and it will be necessary for the pressure of the auxiliary brake means to drop from five atmospheres to two atmospheres (one atmosphere less than the pressure of three atmospheres in the chamber 32) before the movable wall means will start to be displaced toward the valve seat 24. Thus, under the conditions where the pressure in the chamber 32 is three atmospheres and that in the chamber 27 is two atmospheres, the movable wall means is at equilibrium and beyond this point any further drop in the pressure of the auxiliary brake means or increase in the pressure of the main brake means will displace the membrane 28 into engagement with the valve seat 24. Thus, it will be seen that with the control means of the invention it is possible to apply braking forces both from the main and from the auxiliary brake means but the control means automatically operates to limit the total braking force which can be applied from either one or both of the systems, and this total braking force does not exceed the limiting braking force beyond which the wheels would lock.

By changing the force of the spring 33 it is possible to compensate for the drop in the braking force during movement of the spring-pressed piston of the cylinder 15, and the adjustment of the spring 33 should take into consideration the spring characteristic of the spring in each cylinder 15 of the auxiliary brake system.

FIG. 3 shows another embodiment of a control means according to the present invention. The control means 40 of FIG. 3 can replace the control means 16 and except for the details described below is identical therewith. As may be seen from FIG. 3, the control means 40 include a member 41 which is identical with the member 21 and which is connected in the same way to the conduits 14' and 14. The flexible resilient membrane 42 is identical with the membrane 28 and is mounted in the control means in exactly the same way. Thus, the chamber 27 of FIG. 3 is identical with that of FIG. 2. However, in the embodiment of FIG. 3 the upper unit 43 replaces the unit 29. This unit 43 is substantially cylindrical and is covered at its top open end by a cover 44 threaded onto the top end of the member 43 with a suitable sealing ring 45 clamped between the member 43 and its cover 44. This cover 44 is provided with a connection fitting 46 by which connection is made in a fluid-tight manner to the conduit 17. A plate 47 is fixed to the membrane 42 in the same way as the plate 38 of FIG. 2, but this plate 47 has riveted thereto an elongated pin 48 which extends with substantial clearance through a central opening 49 formed in a transverse wall 50 of the member 43, this transverse wall 50 serving to limit the movement of the movable wall means 42, 47 away from valve seat 24. The upper surface of the wall 50, as viewed in FIG. 3, is engaged by the lower end of a coil spring 51 which is coiled about the pin 48 and which engages at its top end the washer 52 formed with an opening through which the top threaded end portion 53 of the pin 48 extends, this threaded portion 53 carrying a nut 54 which engages the washer 52 so as to act therethrough on the spring 51 for adjusting the force thereof. The wall 50 is formed with an opening 55 to provide for free passage of the air through the wall 50, the member 43 providing in its interior the upper chamber 43' which is separated from the chamber 27 by the movable wall means 42, 47. The cover 44 can be removed in order to give access to the nut 54 for the purpose of adjusting the spring 51. It is apparent that with the embodiment of FIG. 3 a spring 51 which is under compression replaces the spring 33 of FIG. 2 which is under tension. It is also clear that the embodiment of FIG. 3 will operate in precisely the same way as the embodiment in FIG. 2.

FIG. 4 shows a unitary assembly which includes components of both brake systems and the control means. Thus, the assembly 60 includes a single-chamber brake cylinder 61, which forms part of the main brake means, a spring brake means which includes the outer cylinder 62, and the control means 63. All three components 61, 62 and 63 are assembled together into a unitary structure which can conveniently be attached directly to a brake drum or to the yoke of a brake disc assembly. For the purpose of mounting the assembly 60, the assembly includes a flange 64 which carries several mounting screws one of which is shown at 65. The flange 64 engages the end wall 66 of the cylinder 62 the portion 67 of which receives the air under pressure of the auxiliary brake means. An annular stiffening ring 68 engages the inner surface of the end wall 66 and screws 69 extend through the stiffening ring 68 and the wall 66 into threaded engagement with the flange 64 for fixing the wall 66 to the flange 64. The flange 64 has a central annular projection 70 extending through a central opening 71 of the wall 66 into the portion 67 of the cylinder 62. The flange 64 is formed with a central bore passing therethrough and houses in its central bore a sealing sleeve 72, a lubricating ring 73, and a guide sleeve 74 which serves to slidably guide the tubular piston rod 75 which extends slidably through the guide sleeve 74 and which has a fluid-tight sliding engagement with the sealing sleeve 72, the lubricating ring 73 serving to lubricate the tubular piston rod 75 so that it slides easily through the flange 64. The tubular piston rod 75 is fixed at its end 76 to a piston 77 which slides within the cylinder 62 and which separates the portion 67 of the cylinder 62 from the remainder thereof. The other end 78 of the tubular piston rod 75 extends outwardly beyond the flange 64 and engages a nut 79 which is threaded onto the threaded end portion 80 of a rod 81 which is located within and which is freely movable with respect to the tubular piston rod 75. The threaded end 80 fixedly carries also the bifurcated head 82 formed with an opening 83 passing therethrough so that it can be fastened to the lever system which actuates the brake shoes. A gap 84 between the piston rod 75 and the flange 64 is fluid-tightly sealed off from the outer atmosphere by a flexible bellows 85 or the like. The flange 64 carries an unillustrated fitting by which it is fluid-tightly connected to the conduit 14, and a bore of the flange which forms an extension of the conduit 14 is illustrated at 14 in FIG. 4. This portion of the conduit 14 extends perpendicularly with respect to a bore 86 which leads to an annular chamber 87 located in a plane making an angle of 45 degrees with the axis of the cylinder 62 and surrounding a valve seat 88 which in turn surrounds the passage 89 leading through the flange 64 and an opening of the wall 66 into the pressure chamber 90 of the portion 67 of the cylinder 62.

The annular chamber 87 forms part of a chamber 91 separated by the flexible membrane 92 from the other chamber 93' of the control means 63 the structure of which is substantially identical with that of the control means 40 of FIG. 3. The periphery of the membrane 92 is clamped between the housing member 93 and a raised portion of the flange 64 to which the housing part 93 is fixed in any suitable way. The open end of the member 93 is closed by the cover 94, with a sealing ring 95 clamped between the members 93 and 94. The member 93 carries a fitting 96 through which the interior chamber 93' communicates in a fluid-tight manner with the conduit 17' which corresponds to the conduit 17 of FIG. 1. The membrane 92 is fixed to a plate 97, which may be vulcanized to the member 92, and to which the pin 98 is riveted, this pin passing with clearance through the opening 99 of the transverse wall 100 which corresponds to the wall 50 of FIG. 3 and which serves to limit the movement of the movable wall means 92, 97 away from the valve seat 88. A spring 101 engages at one end the transverse wall 100 and at its opposite end the washer 102 through which the threaded end portion 103 of the pin 98 passes, this threaded portion 103 carrying the nut 104 which engages the washer 102 and which is available for adjusting the spring 101.

The cylinder 62 is closed at its right end, as viewed in FIG. 4, by a cover 106 which is fixed to the cylinder 62 by a plurality of radial screws 107. The cover 106 is provided in its interior with an annular shoulder 108 which limits the movement of the right end of the powerful spring 109 of the auxiliary brake means, the other end of the spring 109 engaging the piston 77 to urge the latter to the left in opposition to the fluid under pressure within the chamber 90. Thus, the spring 109, the cylinder 67, the piston 77, and the piston rod 75 together form the auxiliary brake means which derives its braking force from the spring 109.

Between the shoulder 108 and the spring 109 is located a flange 110 of a cylinder 111 of the main brake means, this flange 110 being fixed to the cover 106 by the screws 112. A cylindrical portion 113 of the cover 106 is in fluid-tight engagement with the inner surface of the cylinder 111 at the right end thereof, as viewed in FIG. 4, and a sealing ring 114 is mounted in a groove of the cylindrical portion 113 to guarantee fluid-tight engagement between the latter and the cylinder 111. The cover 106 is formed with a central bore 115 through which the conduit 7 communicates with the interior of the cylinder 111, a fitting 116 being provided to provide the fluid-tight connection between the opening 115 and the conduit 7 as well as to provide the connection between the connection between the conduit 7 and the conduit 17'. The bore 115 of the cover 106 has an enlarged cylindrical portion 117 located in the interior of an inner cylindrical projection of the cover 106 which extends into the pressure chamber 119 of the cylinder 111, this projection being formed with radial grooves 118 through which the bore 117 communicates with the chamber 119 even when the piston 120 is at its right end position shown in FIG. 4. This piston 120 of course forms the piston of the brake cylinder 111 of the main brake means, and the cylinder 111 of the single-chamber brake cylinder assembly 61 is formed between its ends with a shoulder 121 and has beyond the shoulder 121 a reduced cylindrical portion which surrounds a cylindrical portion 122 of a coil spring which has to the right of the cylindrically coiled portion 122 thereof the frustoconically coiled portion 123 which bears against the piston 120 to urge the latter to the right to the illustrated end position engaging the inner projection of the cover 106 which is formed with the radial grooves 118.

The end 126 of a piston rod 127 is fixed to the piston 120 with piston 120 being situated between a pair of washers 124 and 125 and with the right end of the piston rod being riveted over the washer 125 as shown so that in this way the piston rod 127 is fixed to the piston 120. The other end 128 of the piston rod 127 extends into the hollow piston rod 75 of the auxiliary brake means and the end 128 of the rod 127 engages the rod 81 which carries the nut 79 engaged by the end 78 of the rod 75 as described above. The cylinder 111 terminates in an annular inwardly directed flange 129 against which the cylindrical portion 122 of the return spring of the main brake cylinder 61 bears. The outer surface of the flange 129 serves as a stop for limiting the movement of the piston 77 and thus limiting the extent to which the spring 109 is compressed. Thus, the parts 110-129 form components of the single-chamber brake cylinder assembly 61 of the main brake means, and of course all of the structure of FIG. 4 is combined into the single unitary assembly 60 which has the components of the main brake means housed within the components of the auxiliary brake means, this auxiliary brake means carrying the control means 63.

When the brakes are released the parts of the assembly 60 take the positions shown in FIG. 4. Through the conduits 14, 14' compressed air reaches the chamber 91 of the control means 63 and flows through the passage 89 into the chamber 90 for maintaining the piston 77 in the illustrated position in opposition to the spring 109, the movable wall means 92, 97 being displaced away from the valve seat 88 at this time. The return spring 123 of course holds the piston 120 in the rest position thereof illustrated in FIG. 4 inasmuch as there is no pressure within the conduit 7. When the valve 6 is actuated by the operator the brake pressure is applied through the conduit 7 into the chamber 119 and the piston 120 advances to the left, as viewed in FIG. 4, so that the piston rod 127 transmits its movement to the rod 81 for advancing the connecting head 82 ot the left and actuating the brakes of the vehicle. When the main brake means is released the parts will return to the illustrated position.

If, when the brakes are released, the pressure of the system should drop for any reason, the pressure in the chamber 90 will drop and when this pressure drops by more than one atmosphere the spring 109 will advance the piston 77 to the left, as viewed in FIG. 4, so that the piston rod 75 will transmit its motion through the nut 79 to the rod 81 for automatically actuating the brakes.

After the valve 6 is opened by the operator the pressure in the conduit 7 increases and the air under pressure flows through the conduit 17' into the chamber 93' of the control means 63 for placing the membrane against the valve seat 88, and thus the air under pressure cannot escape from the chamber 90. If simultaneously with the opening of the valve 6 the valve 13 is actuated to release the spring 109, at this time the spring 109 will nevertheless be maintained in its compressed condition preventing the force of the auxiliary brake means from being added to the force of the main brake means, as described above.

Of course, it is possible to use a hydraulic fluid system instead of a pneumatic fluid system. In this case the operation of the control means 16, 40 or 63 remains unchanged.

It will be understood that each of the elements described above, or two or more together, may also find a useful application in other types of brake systems differing from the types described above.

While the invention has been illustrated and described as embodied in main and auxiliary brake systems, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a vehicle, in combination, main fluid-operated brake means for braking the vehicle during normal operation thereof; auxiliary fluid-operated brake means for braking the vehicle at times other than during normal operation thereof, as when the vehicle is stationary, for example; a housing having an interior divided into a pair of separate chambers maintained permanently fluid-tightly independent of each other by a movable wall in said housing which moves in response to the pressure differential between said chambers, said main and auxiliary fluid-operated brake means respectively communicating with said chambers; and means carried by said housing and cooperating with said movable wall thereof for preventing the braking force applied by said auxiliary brake means from being increased when the differential of the pressures in said chambers places said wall at a given position in said housing.

2. In a vehicle, in combination, main fluid-operated brake means for braking the vehicle during normal operation thereof; auxiliary fluid-operated brake means for braking the vehicle at times other than during normal operation thereof, as when the vehicle is stationary, for example; a housing having an interior divided into a pair of separate chambers maintained permanently fluid-tightly independent of each other by a movable wall in said housing which moves in response to the pressure differential between said chambers, said main and auxiliary fluid-operated brake means respectively communicating with said chambers; and a valve seat located in said housing and forming a part of the path of fluid flow of the fluid-operated auxiliary brake means, said movable wall engaging said valve seat to prevent the flow of fluid of said auxiliary brake means when a given differential exists between the pressures in said chambers.

3. In a vehicle, in combination, main fluid-operated brake means for braking the vehicle during normal operation thereof; auxiliary fluid-operated braking means for braking the vehicle at times other than normal operation thereof as when the vehicle is stationary, for example; a housing carrying a flexible membrane in its interior, said membrane dividing the interior of said housing into a pair of chambers which are maintained out of communication with each other by said membrane so as to be permanently fluid-tightly separated from one another, said main and auxiliary brake means respectively communicating with said chambers and said flexible membrane assuming positions in response to the difference between the pressures prevailing in said chambers, and said fluid-operating auxiliary brake means including a valve through which fluid under pressure flows to and from said fluid-operated auxiliary brake means and having a valve seat in the path of movement of said membrane to be closed thereby for preventing the flow of pressure fluid of said auxiliary brake means when there is a given pressure differential between said chambers.

4. In a vehicle, in combination, main fluid-operated brake means for braking the vehicle during normal operation thereof; auxiliary fluid-operated brake means for braking the vehicle at times other than during normal operation thereof as when the vehicle is stationary, for example; a housing and a movable wall means in the interior of said housing dividing said interior into a pair of chambers maintained fluid-tightly independent of each other by said movable wall means, the latter automatically assuming in said housing positions determined by the pressure differential between said chambers, said main and auxiliary brake means respectively communicating with said chambers; valve means communicating with that chamber with which said auxiliary brake means communicates and forming part of the path of fluid flow of said auxiliary brake means, said valve means including a valve seat located in the path of movement of said movable wall means to be engaged by the latter for closing said valve means when said movable wall means reaches a position engaging said valve seat in response to the pressure differential in said chambers; and spring means operatively connected to said movable wall means and urging the latter away from said valve seat.

5. In a vehicle as recited in claim 4, said auxiliary fluid-operated brake means including a spring-pressed brake member opposed by the fluid pressure of said fluid-operated auxiliary brake means so that the braking force of the latter increases as the fluid pressure thereof decreases, and adjusting means operatively connected to said spring means for adjusting the latter to urge said movable wall means away from said valve seat with a force corresponding to the difference between the force with which said spring-pressed member acts and the force with which said main brake means acts.

6. In a vehicle as recited in claim 5, said housing being carried by said auxiliary brake means.

7. In a vehicle, in combination, main fluid-operated brake means including a cylinder and piston responding to fluid pressure for braking the vehicle during normal operation thereof; auxiliary fluid-operated brake means for braking the vehicle at times other than during normal operation thereof, such as when the vehicle is stationary, for example, said auxiliary brake means including a spring-operated piston and cylinder acting to apply the force of said auxiliary brake means and opposed by a fluid under pressure so that the force of said auxiliary brake means increases as the fluid pressure thereof decreases; and control means operatively connected to both of said brake means for limiting the extent to which the braking force of said main brake means can be increased by said auxiliary brake means, said control means including a housing having in its interior a pair of chambers permanently fluid-tightly separated by a movable wall which automatically assumes positions determined by the pressure differential between said chambers, said main and auxiliary brake means respectively communicating with said chambers and said auxiliary brake means including a valve seat located in the path of fluid flow of said auxiliary brake means and engaged by said movable wall for preventing the flow of the pressure fluid of said auxiliary brake means when said movable wall reaches a position engaging said valve seat in response to a given pressure differential between said chambers, said main and auxiliary brake means and said control means forming a single unitary assembly.

8. In a vehicle as recited in claim 7, said unitary assembly having said main brake means housed within said auxiliary brake means and said control means being carried by said auxiliary brake means.

9. In a vehicle, in combination, main brake means for braking the vehicle during normal operation thereof, said main brake means being movable between a first position in which the vehicle is not braked and a second position braking the vehicle; auxiliary fluid operated brake means for braking the vehicle at times other than normal operation thereof; actuating means for said auxiliary fluid operated brake means; a fluid conduit connecting said actuating means with said auxiliary fluid operated brake means, said auxiliary brake means being in operative condition when the fluid in said auxiliary brake means is under pressure; valve means in said fluid conduit adapted to be closed and to maintain when closed said fluid in said auxiliary brake means under pressure so as to maintain said auxiliary brake means in inoperative condition while said valve means is closed; and second actuating means for said main brake means, said second actuating means being operatively connected to said valve means for automatically closing said valve means when said main brake means are moved to said second position thereof.

10. A combination as set forth in claim 9, wherein said connection between said second actuating means and said valve means comprises a second fluid conduit, and wherein said valve means includes a housing having an interior divided into a pair of separate chambers maintained permanently fluid-tightly independent of each other by a movable wall in said housing, said first mentioned conduit means communicating with one of said chambers and said second conduit means communicating with the other of said chambers.

References Cited by the Examiner

UNITED STATES PATENTS 3,095,244 6/1963 Valentine et al. _____ 303—9
3,116,095 12/1963 Leighton _____ 303—9

EUGENE G. BOTZ, *Primary Examiner.*